US012670236B2

(12) United States Patent
He et al.

(10) Patent No.: US 12,670,236 B2
(45) Date of Patent: Jun. 30, 2026

(54) METHOD FOR TRAINING CROSS-MODAL RETRIEVAL MODEL, ELECTRONIC DEVICE AND STORAGE MEDIUM

(71) Applicant: BEIJING BAIDU NETCOM SCIENCE TECHNOLOGY CO., LTD., Beijing (CN)

(72) Inventors: Feng He, Beijing (CN); Qi Wang, Beijing (CN); Zhifan Feng, Beijing (CN); Hu Yang, Beijing (CN); Chunguang Chai, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 1063 days.

(21) Appl. No.: 17/502,385

(22) Filed: Oct. 15, 2021

(65) Prior Publication Data

US 2022/0284246 A1 Sep. 8, 2022

(30) Foreign Application Priority Data

Mar. 5, 2021 (CN) ......................... 202110244645.X

(51) Int. Cl.
*G06F 18/25* (2023.01)
*G06F 18/21* (2023.01)
*G06F 18/22* (2023.01)

(52) U.S. Cl.
CPC ........ *G06F 18/256* (2023.01); *G06F 18/2178* (2023.01); *G06F 18/22* (2023.01)

(58) Field of Classification Search
CPC .... G06F 18/256; G06F 18/2178; G06F 18/22; G06N 20/00; G06N 20/10; G06N 20/20; G06N 3/045
See application file for complete search history.

(56) References Cited

U.S. PATENT DOCUMENTS 11,308,353 B2 * 4/2022 Singh .................. G06F 18/2451
11,586,927 B2 * 2/2023 Li .......................... G06N 3/084
(Continued)

FOREIGN PATENT DOCUMENTS

CN 108182279 A 6/2018
CN 109522850 A 3/2019
(Continued)

OTHER PUBLICATIONS

Yang, Zhao, et al. "A novel soft margin loss function for deep discriminative embedding learning." IEEE Access 8 (2020): 202785-202794. (Year: 2020).*
(Continued)

*Primary Examiner* — Andrew T Chiusano
(74) *Attorney, Agent, or Firm* — BROOKS KUSHMAN P.C.

(57) ABSTRACT

The present disclosure discloses a method for training a cross-modal retrieval model, an electronic device and a storage medium, and relates to the field of computer technologies, and particularly to the field of artificial intelligence technologies, such as knowledge graph technologies, computer vision technologies, deep learning technologies, or the like. The method for training a cross-modal retrieval model includes: determining similarity of a cross-modal sample pair according to the cross-modal sample pair, the cross-modal sample pair including a sample of a first modal and a sample of a second modal, and the first modal being different from the second modal; determining a soft margin based on the similarity, and determining a soft margin loss function based on the soft margin; and determining a total loss function based on the soft margin loss function, and training a cross-modal retrieval model according to the total loss function.

10 Claims, 8 Drawing Sheets

(56) References Cited

U.S. PATENT DOCUMENTS

| | | | | |
|---|---|---|---|---|
| 2020/0250537 | A1 | 8/2020 | Li et al. | |
| 2020/0302340 | A1 | 9/2020 | Durand et al. | |
| 2022/0012530 | A1* | 1/2022 | Singh | ........................ G06T 7/11 |

FOREIGN PATENT DOCUMENTS

| | | | |
|---|---|---|---|
| CN | 111091010 | A | 5/2020 |
| CN | 111325223 | A | 6/2020 |
| CN | 111507218 | A | 8/2020 |
| CN | 111862175 | A | 10/2020 |
| CN | 112119411 | A | 12/2020 |
| CN | 112148916 | A | 12/2020 |
| JP | 2020177465 | A | 10/2020 |

OTHER PUBLICATIONS

Zhang, Linguang, and Szymon Rusinkiewicz. "Learning local descriptors with a CDF-based dynamic soft margin." Proceedings of the IEEE/CVF International Conference on Computer Vision. 2019. (Year: 2019).*

Wang, Bokun, et al. "Adversarial cross-modal retrieval." Proceedings of the 25th ACM international conference on Multimedia. 2017. (Year: 2017).*

Hermans, Alexander, Lucas Beyer, and Bastian Leibe. "In defense of the triplet loss for person re-identification." arXiv preprint arXiv:1703.07737 (2017). (Year: 2017).*

Deng, Cheng, et al. "Triplet-based deep hashing network for cross-modal retrieval." IEEE Transactions on Image Processing 27.8 (2018): 3893-3903. (Year: 2018).*

Semedo, David, and João Magalhães. "Cross-modal subspace learning with scheduled adaptive margin constraints." Proceedings of the 27th ACM International Conference on Multimedia. 2019. (Year: 2019).*

He, Feng, et al. "Improving video retrieval by adaptive margin." Proceedings of the 44th international ACM SIGIR conference on research and development in information retrieval. 2021. (Year: 2021).*

Yasuda et al. "Cross-Mode Speech Search based on Specific Correlation of Weak Tags", Acoustical Society of Japan 2020 Fall Conference Lecture Proceedings CD-ROM [CD-ROM], Japan, Acoustical Society of Japan, Aug. 26, 2020, pp. 165-168, Internet<URL:https://www.jstage.jst.go.jp/article/jsdtpr/9/0/9_55/_pdf/-char/ja>, 9 pages.

Wei et al., Universal Weighting Metric Learning for Cross-Modal Matching, 2020 IEEE/CVF Conference on Computer Vision and Pattern Recognition (CVPR), 13002-13011.

Semedo, et al., Adaptive Temporal Triplet-loss for Cross-modal Embedding Learning, MM '20: Proceedings of the 28th ACM International Conference on Multimedia, ACM, Oct. 12, 2020, pp. 1152-1161, Internet <URL:https://doi.org/10.1145/3394171.3413540>.

Extended European Search Report of European application No. 21201915.2 dated Mar. 11, 2022, 11 pages.

Semedo et al., "Adaptive Temporal Triplet-loss for Cross-modal Embedding Learning", Proceedings of the 28th ACM International Conference on Multimedia, ACMPUB27, New York, NY, USA, Oct. 12, 2020, pp. 1152-1161, XP058478170.

Aggarwal et al., "Text-based Person Search via Attribute-aided Matching", 2020 IEEE Winter Conference on Applications of Computer Vision (WACV), IEEE, Mar. 1, 2020, pp. 2606-2614, XP033771285.

Wu et al., "Online Fast Adaptive Low-Rank Similarity Learning for Cross-Modal Retrieval", IEEE Transactions on Multimedia, IEEE, USA, vol. 22, No. 5, Sep. 20, 2019, pp. 1310-13322, XP011784986.

Liu, Triplet Loss and Manifold Dimensionally Reduction Based Method for Text-Independent Speaker Recognition, Harbin Institute of Technology, School of Computer Science and Technology, Jan. 17, 2020, 75 pages.

* cited by examiner

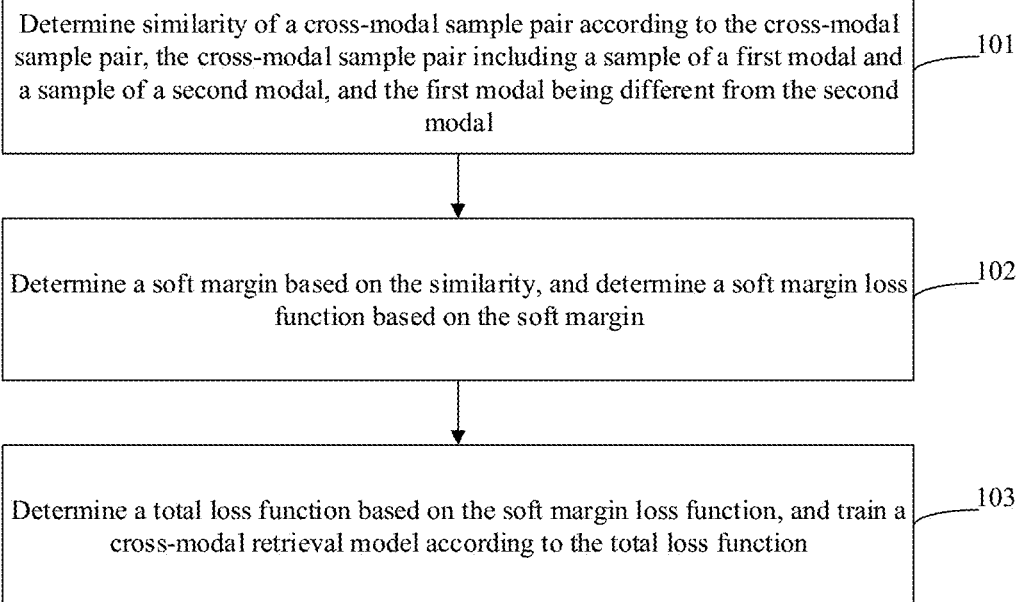

Determine similarity of a cross-modal sample pair according to the cross-modal sample pair, the cross-modal sample pair including a sample of a first modal and a sample of a second modal, and the first modal being different from the second modal —101

Determine a soft margin based on the similarity, and determine a soft margin loss function based on the soft margin —102

Determine a total loss function based on the soft margin loss function, and train a cross-modal retrieval model according to the total loss function —103

Fig. 1

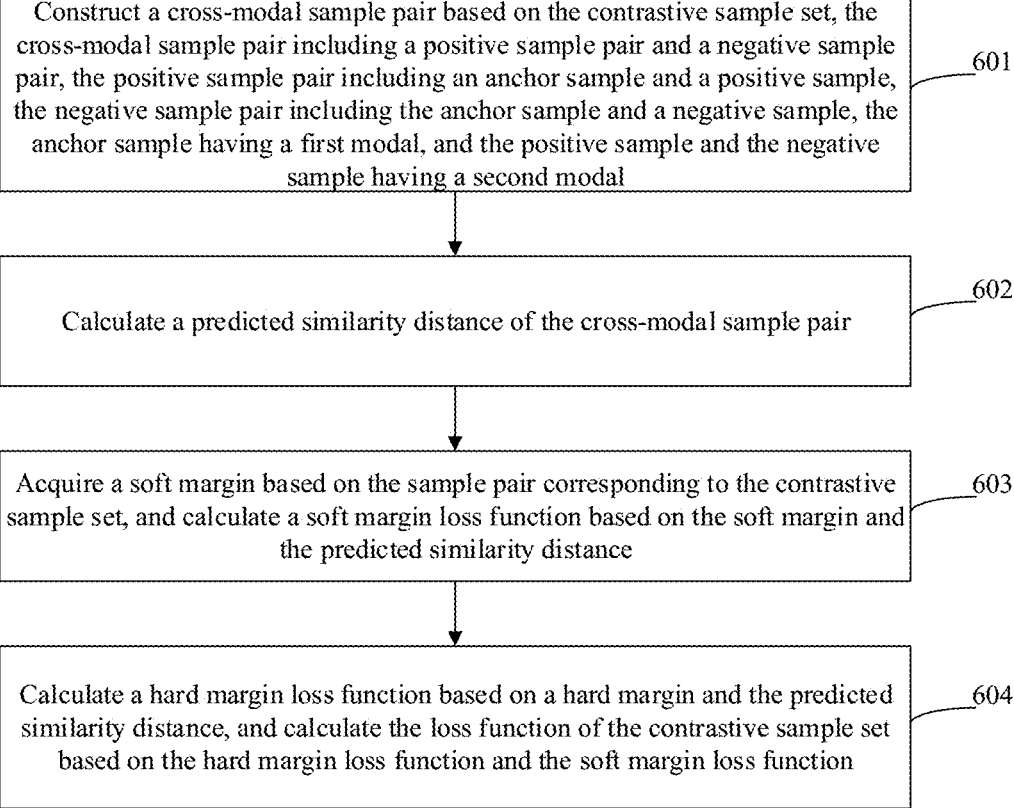

Construct a cross-modal sample pair based on the contrastive sample set, the cross-modal sample pair including a positive sample pair and a negative sample pair, the positive sample pair including an anchor sample and a positive sample, the negative sample pair including the anchor sample and a negative sample, the anchor sample having a first modal, and the positive sample and the negative sample having a second modal ⸺601

Calculate a predicted similarity distance of the cross-modal sample pair ⸺602

Acquire a soft margin based on the sample pair corresponding to the contrastive sample set, and calculate a soft margin loss function based on the soft margin and the predicted similarity distance ⸺603

Calculate a hard margin loss function based on a hard margin and the predicted similarity distance, and calculate the loss function of the contrastive sample set based on the hard margin loss function and the soft margin loss function ⸺604

Fig. 6

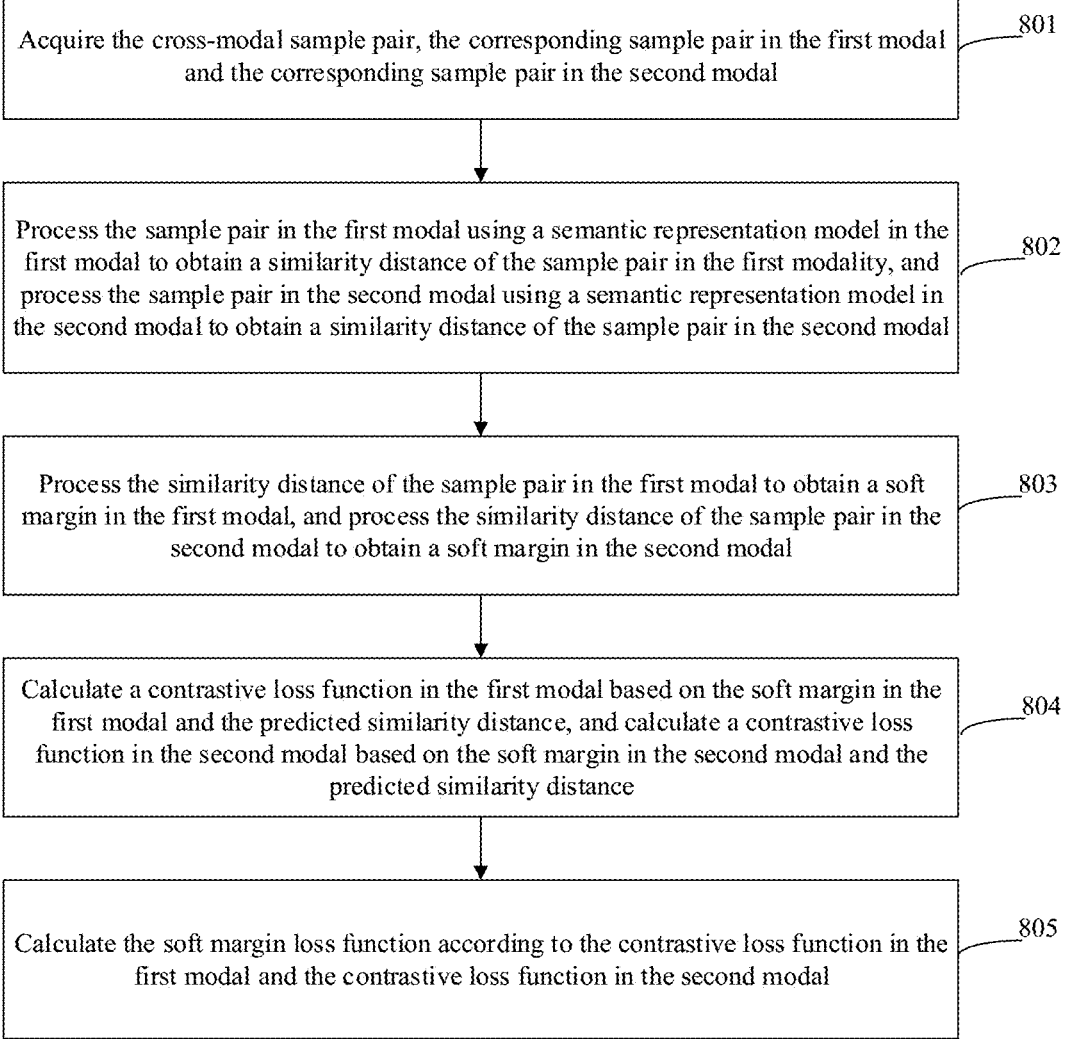

Acquire the cross-modal sample pair, the corresponding sample pair in the first modal and the corresponding sample pair in the second modal ⟋—801

Process the sample pair in the first modal using a semantic representation model in the first modal to obtain a similarity distance of the sample pair in the first modality, and process the sample pair in the second modal using a semantic representation model in the second modal to obtain a similarity distance of the sample pair in the second modal ⟋—802

Process the similarity distance of the sample pair in the first modal to obtain a soft margin in the first modal, and process the similarity distance of the sample pair in the second modal to obtain a soft margin in the second modal ⟋—803

Calculate a contrastive loss function in the first modal based on the soft margin in the first modal and the predicted similarity distance, and calculate a contrastive loss function in the second modal based on the soft margin in the second modal and the predicted similarity distance ⟋—804

Calculate the soft margin loss function according to the contrastive loss function in the first modal and the contrastive loss function in the second modal ⟋—805

METHOD FOR TRAINING CROSS-MODAL RETRIEVAL MODEL, ELECTRONIC DEVICE AND STORAGE MEDIUM

CROSS-REFERENCE TO RELATED APPLICATIONS

The present application claims the priority of Chinese Patent Application No. 202110244645.X, filed on Mar. 5, 2021, with the title of "Method and apparatus for training cross-modal retrieval model, device and storage medium." The disclosure of the above application is incorporated herein by reference in its entirety.

TECHNICAL FIELD

The present disclosure relates to the field of computer technologies, and particularly relates to the field of artificial intelligence technologies, such as knowledge graph technologies, computer vision technologies, deep learning technologies, or the like, and particularly to a method for training a cross-modal retrieval model, an electronic device and a storage medium.

BACKGROUND

Artificial intelligence (AI) is a subject of researching how to cause a computer to simulate certain thought processes and intelligent behaviors (for example, learning, reasoning, thinking, planning, or the like) of a human, and includes both hardware-level technologies and software-level technologies. Generally, the hardware technologies of the AI include technologies, such as a sensor, a dedicated artificial intelligence chip, cloud computing, distributed storage, big data processing, or the like; the software technologies of the AI mainly include a computer vision technology, a voice recognition technology, a natural language processing technology, a machine learning/deep learning technology, a big data processing technology, a knowledge graph technology, or the like.

With a development of an Internet technology, data on a network has increasing varieties, such as a text, an image, a video, or the like, and each type of data may be regarded as a modal. Cross-modal retrieval refers to retrieval of data of one modal using data of another modal, such as retrieval of a video using a text. A cross-modal retrieval model may be used for the cross-modal retrieval, and data of one modal is input into the cross-modal retrieval model to output data of another modal. When the cross-modal retrieval model is trained, a contrastive loss function may be used, and a margin is one parameter of the contrastive loss function.

SUMMARY

The present disclosure provides a method for training a cross-modal retrieval model, an electronic device and a storage medium.

According to an aspect of the present disclosure, there is provided a method for training a cross-modal retrieval model, including: determining similarity of a cross-modal sample pair according to the cross-modal sample pair, the cross-modal sample pair including a sample of a first modal and a sample of a second modal, and the first modal being different from the second modal; determining a soft margin based on the similarity, and determining a soft margin loss function based on the soft margin; and determining a total loss function based on the soft margin loss function, and training a cross-modal retrieval model according to the total loss function.

According to another aspect of the present disclosure, there is provided an electronic device, including: at least one processor; and a memory communicatively connected with the at least one processor; wherein the memory stores instructions executable by the at least one processor, and the instructions are executed by the at least one processor to enable the at least one processor to perform a method for training a cross-modal retrieval model, wherein the method includes: determining similarity of a cross-modal sample pair according to the cross-modal sample pair, the cross-modal sample pair including a sample of a first modal and a sample of a second modal, and the first modal being different from the second modal; determining a soft margin based on the similarity, and determining a soft margin loss function based on the soft margin; and determining a total loss function based on the soft margin loss function, and training a cross-modal retrieval model according to the total loss function.

According to another aspect of the present disclosure, there is provided anon-transitory computer readable storage medium with computer instructions stored thereon, wherein the computer instructions are used for causing a computer to perform a method for training a cross-modal retrieval model, wherein the method includes: determining similarity of a cross-modal sample pair according to the cross-modal sample pair, the cross-modal sample pair comprising a sample of a first modal and a sample of a second modal, and the first modal being different from the second modal; determining a soft margin based on the similarity, and determining a soft margin loss function based on the soft margin; and determining a total loss function based on the soft margin loss function, and training a cross-modal retrieval model according to the total loss function.

It should be understood that the statements in this section are not intended to identify key or critical features of the embodiments of the present disclosure, nor limit the scope of the present disclosure. Other features of the present disclosure will become apparent from the following description.

BRIEF DESCRIPTION OF THE DRAWINGS

The drawings are used for better understanding the present solution and do not constitute a limitation of the present disclosure, wherein:

FIG. 1 is a schematic diagram according to a first embodiment of the present disclosure;

FIG. 6 is a schematic diagram according to a sixth embodiment of the present disclosure;

FIG. 8 is a schematic diagram according to an eighth embodiment of the present disclosure;

DETAILED DESCRIPTION

The following part will illustrate exemplary embodiments of the present disclosure with reference to the drawings, including various details of the embodiments of the present disclosure for a better understanding. The embodiments should be regarded only as exemplary ones. Therefore, those skilled in the art should appreciate that various changes or modifications can be made with respect to the embodiments described herein without departing from the scope and spirit of the present disclosure. Similarly, for clarity and conciseness, the descriptions of the known functions and structures are omitted in the descriptions below.

FIG. 1 is a schematic diagram according to a first embodiment of the present disclosure. The present embodiment provides a method for training a cross-modal retrieval model, including:

101: determining similarity of a cross-modal sample pair according to the cross-modal sample pair, the cross-modal sample pair including a sample of a first modal and a sample of a second modal, and the first modal being different from the second modal;

102: determining a soft margin based on the similarity, and determining a soft margin loss function based on the soft margin; and

103: determining a total loss function based on the soft margin loss function, and training a cross-modal retrieval model according to the total loss function.

Figure 2:
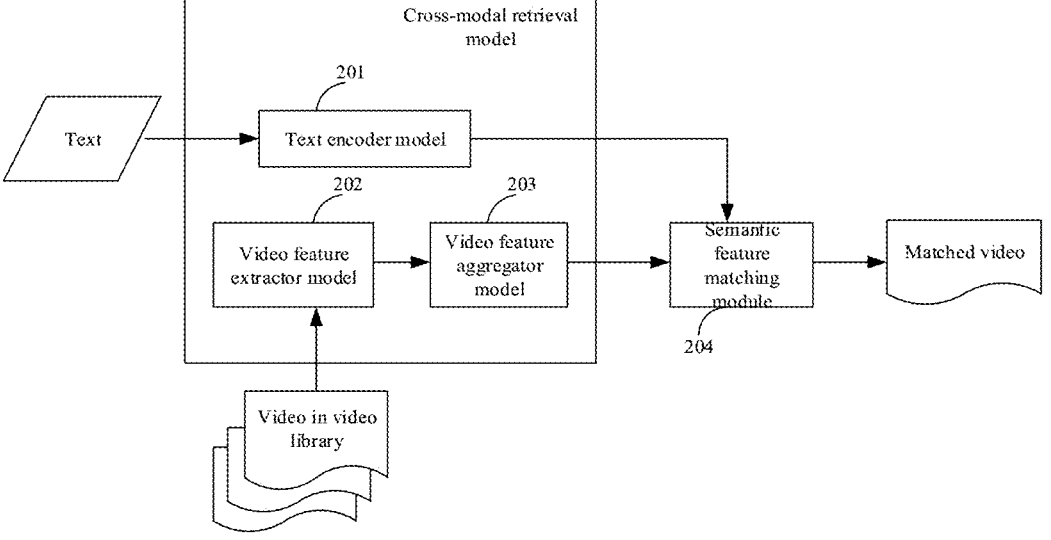
FIG. 2 is a schematic diagram according to a second embodiment of the present disclosure.

Referring to FIG. 2, when a user performs cross-modal retrieval, taking retrieval of a video using a text as an example, a cross-modal retrieval system receives a text input by the user, such as "car", and may find a video matched with the text using the cross-modal retrieval model, such as a video related to "car", and then feed the matched video back to the user. The cross-modal retrieval model may include: a text encoder model 201 which converts a text input by the user into a text representation; and a video encoder model which converts a video in a video library into a video representation. Further, the video encoder model may include a video feature extractor model 202 configured to extract video features and a video feature aggregator model 203 configured to aggregate the video features. Corresponding semantic representation extractor models in a related art may be adopted as backbone structures of the text encoder model and the video feature extractor model; for example, the text encoder model is configured as a bidirectional encoder representations from transformers (BERT) model, and the video feature extractor model is configured as a convolutional neural network (CNN) model, such as resnet. The video feature aggregator model may also adopt a feature aggregation mode in the related art; for example, generally, the video feature extractor model extracts multimodal video features, and the video feature aggregator module may perform weighted summation on the video feature of each modal to obtain an aggregated video feature, i.e., the video representation. Corresponding semantic representations, i.e., the text representation and the video representation, may be obtained by the text encoder model and the video encoder model, and then, the video representation most matched with the text representation may be acquired by a semantic feature matching module 204, and a corresponding video is used as the video matched with the text input by the user. The semantic feature matching operation may also be implemented using various related arts, such as an approximate nearest neighbor (ANN) algorithm.

As mentioned above, the cross-modal retrieval may be performed using the cross-modal retrieval model, and the present embodiment provides the method for training a cross-modal model, so as to provide a model with a better effect, thereby improving a cross-modal retrieval effect.

A single device body, such as a server, may serve as a subject for executing the present embodiment.

The first modal and the second modal are two different modals, and in the embodiment of the present disclosure, the first modal is a text, and the second modal is a video.

In order to distinguish from a margin usually used in the contrastive loss function, the usually used margin has a fixed value, and may be referred to as a hard margin; in the embodiment of the present disclosure, a margin may be determined based on the above-mentioned similarity, does not have a fixed value, and may be referred to as a soft margin. Correspondingly, a loss function corresponding to the hard margin may be referred to as a hard margin loss function, and a loss function corresponding to the soft margin may be referred to as a soft margin loss function.

In a typical calculation of the loss function based on the hard margin with a fixed value, a total loss function is calculated only based on the hard margin loss function. In the embodiment of the present disclosure, the soft margin and the soft margin loss function are introduced, such that the total loss function is calculated based on both the hard margin loss function and the soft margin loss function.

In the present embodiment, the soft margin is determined based on the similarity of the cross-modal sample pair, the soft margin loss function is calculated based on the soft margin, and the total loss function is calculated based on the soft margin loss function, such that different margins may be selected according to different cross-modal sample pairs, thus avoiding a problem caused by the fixed margin, and improving the retrieval effect of the cross-modal retrieval model.

In some embodiments, the contrastive loss function may be a triplet contrastive loss function. In the triplet contrastive loss function, the soft margin is determined based on a similarity distance which is a distance between similarity of a positive sample pair and similarity of a negative sample pair.

That is, at least one cross-modal sample pair is provided, and includes a positive sample pair and a negative sample pair, the positive sample pair includes an anchor sample and a positive sample, the negative sample pair includes the anchor sample and a negative sample, the anchor sample has the first modal, and the positive sample and the negative sample have the second modal; the determining a soft margin based on the similarity includes: calculating a distance between similarity of the positive sample pair and similarity of the negative sample pair to obtain a similarity distance; and determining the soft margin based on the similarity distance.

For the triplet contrastive loss function, the sample may include an anchor sample, a positive sample, and a negative sample. Assuming that the anchor sample, the positive sample and the negative sample are denoted by A, P and N respectively, sample pair <A, P> formed by the anchor sample and the positive sample may be referred to as a positive sample pair, and sample pair <A, N> formed by the anchor sample and the negative sample may be referred to as a negative sample pair. The anchor sample is for example a text in a sample set; the positive sample refers to a video related to the text in the sample set; the negative sample is a randomly selected video in the sample set, and the video may or may not be related to the text.

Figure 3:
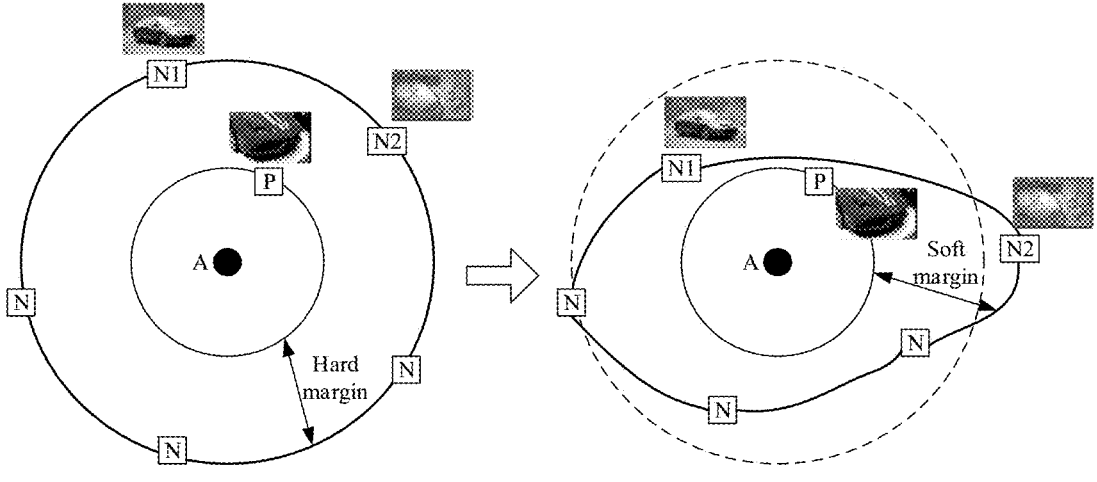
FIG. 3 is a schematic diagram according to a third embodiment of the present disclosure.

As shown in FIG. 3, assuming that the anchor sample is a text "car", the positive sample is denoted by P and is a video related to "car", the negative sample is denoted by N and is a randomly selected video (in the drawing, the video is denoted by video frames) which may or may not be related to "car", and in FIG. 3, the negative sample includes a video (N1) related to "car" and a video (N2) not related to "car". In the related art, as shown on the left side of FIG. 3, the margin has a fixed value and is a hard margin, whereas in the embodiment of the present disclosure, as shown on the right side of FIG. 3, the margin does not have a fixed value and is a soft margin, and specifically, if one negative sample is related to the anchor sample, the margin corresponding to the related negative sample should be less than the margin corresponding to the unrelated negative sample.

Since the negative sample may or may not be related to the anchor sample, if a fixed margin is used, a wrong learning direction may be caused, thus reducing the effect of the cross-modal retrieval model.

In the present embodiment, the soft margin may be determined based on the similarity distance between the similarity of the positive sample pair and the similarity of the negative sample pair, which may be applicable to a scenario of the triplet contrastive loss function.

Figure 4:
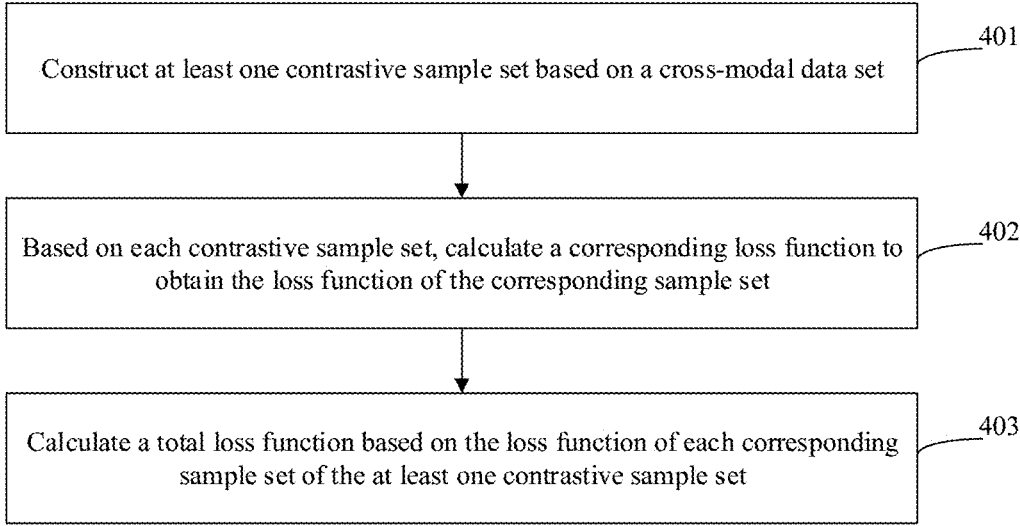
FIG. 4 is a schematic diagram according to a fourth embodiment of the present disclosure.

FIG. 4 is a schematic diagram according to a fourth embodiment of the present disclosure, the present embodiment provides a method for training a cross-modal retrieval model, and as shown in FIG. 4, the method includes:

401: constructing at least one contrastive sample set based on a cross-modal data set.

The cross-modal data set is formed by a plurality of cross-modal matched sample pairs, each cross-modal matched sample pair includes two mutually matched samples with different modals, and assuming that the two different modals are a text and a video respectively, one cross-modal matched sample pair may be represented as (v, t), v representing the video, and t representing the text.

Taking a triplet contrast as an example, each contrastive sample set includes an anchor sample, a positive sample and a negative sample, the anchor sample is one sample in the cross-modal matched sample pair, the positive sample is the other sample in the cross-modal matched sample pair where the anchor sample is located, and the negative sample is a sample which has a different modal from the anchor sample in the cross-modal matched sample pair where a randomly selected non-anchor sample is located. For example, two cross-modal matched sample pairs are $\langle v^i, t^i \rangle$ and $\langle v^j, t^j \rangle$ respectively, and assuming that the selected anchor sample is $t^i$, the positive sample is $v^i$, and the negative sample is $v^j$, such that the contrastive sample set may be $(t^i, v^i, v^j)$.

In general, two contrastive sample sets corresponding to the cross-modal retrieval may be selected; that is, in addition to the above-mentioned contrastive sample set $(t^i, v^i, v^j)$, another contrastive sample set $(v^i, t^i, t^j)$ may be selected.

402: based on each contrastive sample set, calculating a corresponding loss function to obtain the loss function of the corresponding sample set.

The processes of calculating the corresponding loss functions based on the contrastive sample sets are similar, and specific reference may be made to the following description.

403: calculating a total loss function based on the loss function of each corresponding sample set of the at least one contrastive sample set.

For example, the loss functions of the corresponding sample sets are added, and the added function is used as the total loss function.

Figure 5:
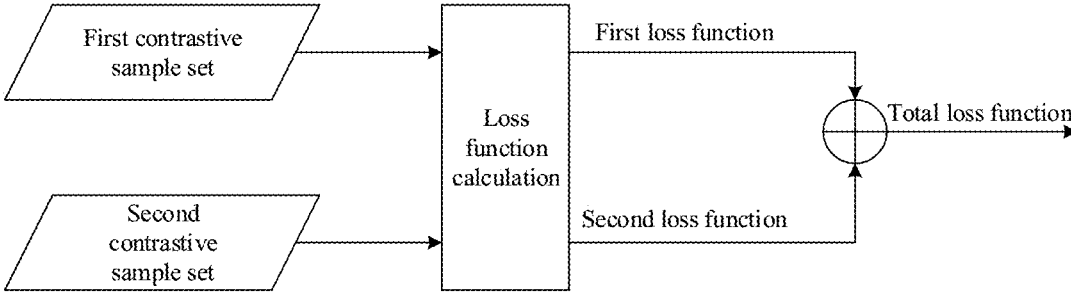
FIG. 5 is a schematic diagram according to a fifth embodiment of the present disclosure.

For example, referring to FIG. 5, assuming that the two contrastive sample sets are referred to as a first contrastive sample set and a second contrastive sample set respectively, and the corresponding loss functions may be referred to as a first loss function and a second loss function; as shown in FIG. 5, the first loss function and the second loss function may be added, and the added function is taken as the total loss function.

This process is formulated as:

$$L^{full} = L_v^{full} + L_t^{full}$$

wherein $L^{full}$ is the total loss function, and $$L_v^{full}, L_t^{full}$$

are the first loss function and the second loss function respectively; that is, $$L_v^{full}$$

is the loss function calculated based on $(t^i, v^i, v^j)$, and $$L_t^{full}$$

is the loss function calculated based on $(v^i, t^i, t^j)$.

After the total loss function is obtained, the cross-modal retrieval model may be trained using the total loss function; that is, parameters of the text encoder model and parameters of the video encoder model are adjusted until the total loss function converges.

In the present embodiment, the total loss function is calculated based on the loss function of each corresponding sample set, such that composition conditions of different negative sample pairs may be considered, thus improving accuracy of the total loss function and then the effect of the cross-modal retrieval model.

The above describes the calculation of the loss function based on each contrastive sample set, so as to calculate the total loss function based on the loss functions of each contrastive sample set, and train the cross-modal retrieval model based on the total loss function. The calculation process of the loss function of each contrastive sample set is described below. The calculation processes of the loss functions of the contrastive sample sets are similar, and in the following, taking the calculation process of one contrastive sample set as an example, referring to FIG. 6, the method includes:

601: constructing a cross-modal sample pair based on the contrastive sample set, the cross-modal sample pair including a positive sample pair and a negative sample pair, the positive sample pair including an anchor sample and a positive sample, the negative sample pair including the anchor sample and a negative sample, the anchor sample having a first modal, and the positive sample and the negative sample having a second modal.

Taking the contrastive sample set $(t^i, v^i, v^j)$ as an example, the constructed positive sample pair is $<v^i, t^i>$, and the negative sample pair is $<vj, ti>$.

602: calculating a predicted similarity distance of the cross-modal sample pair.

The predicted similarity distance refers to a distance between a first predicted similarity which is predicted similarity of the positive sample pair and a second predicted similarity which is predicted similarity of the negative sample pair.

Figure 7:
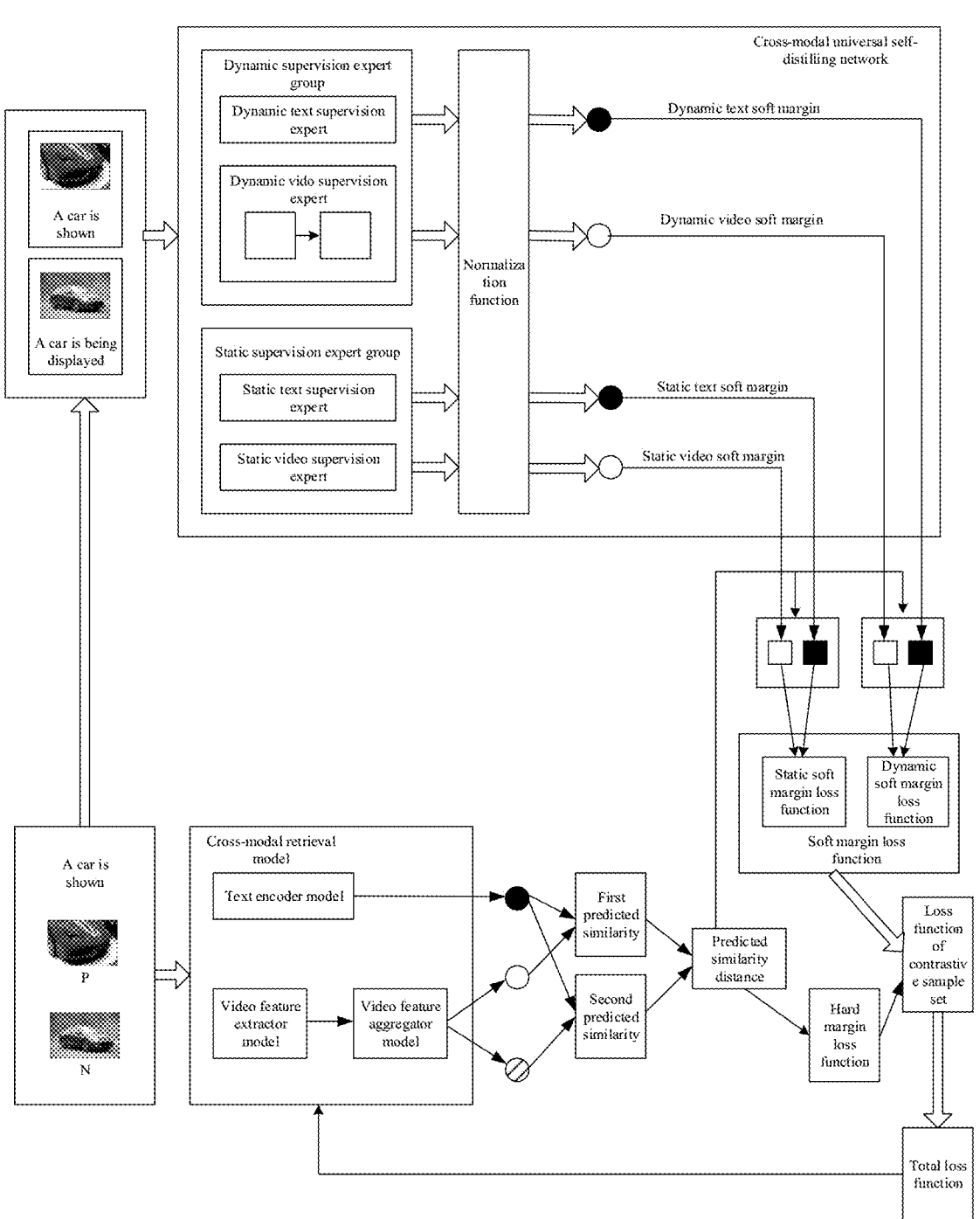
FIG. 7 is a schematic diagram according to a seventh embodiment of the present disclosure.

As shown in FIG. 7, the anchor sample is text "a car is shown", the positive sample is denoted by P, the negative sample is denoted by N, and both the positive sample and the negative sample in FIG. 7 are videos related to a car.

For example, if the anchor sample is a text, the anchor sample may be referred to as an anchor text, and the positive sample and the negative sample may be referred to as a positive video and a negative video respectively. After acquired, the contrastive sample set (the anchor text, the positive video and the negative video) may be input into the cross-modal retrieval model, the text encoder model encodes the anchor text to obtain a predicted text representation, and the video encoder model (the video feature extractor model and the video feature aggregator module) encodes the positive video and the negative video to obtain a first predicted video representation and a second predicted video representation; then, similarity between the predicted text representation and the first predicted video representation is calculated as the first predicted similarity, and similarity between the predicted text representation and the second predicted video representation is calculated as the second predicted similarity; and a difference between the second predicted similarity and the first predicted similarity is calculated as the predicted similarity distance.

603: acquiring a soft margin based on the sample pair corresponding to the contrastive sample set, and calculating a soft margin loss function based on the soft margin and the predicted similarity distance.

For the calculation processes of the soft margin and the soft margin loss function, reference may be made to the following description.

604: calculating a hard margin loss function based on a hard margin and the predicted similarity distance, and calculating the loss function of the contrastive sample set based on the hard margin loss function and the soft margin loss function.

The hard margin loss function refers to a contrastive loss function calculated based on a fixed margin, and may be realized using the related art.

After obtained, the soft margin loss function and the hard margin loss function may be added, and the loss function of the contrastive sample set is obtained based on the added loss function.

Further, the soft margin loss function may include a soft margin loss function for at least one state, and correspondingly, the soft margin loss functions for the states may be subjected to weighted summation, the result and the hard margin loss function are added, and then, the loss function of the contrastive sample set may be calculated based on the added loss function. As shown in FIG. 7, the soft margin loss function for at least one state may include a static soft margin loss function and a dynamic soft margin loss function.

This process is formulated as:

$$L_v^{full} =$$

$$\frac{1}{B}\sum_{i=1}^{B}\max_j [l_v^h(i, j; m) + \lambda * l_v^g(i, j; \Omega_d, \Gamma_d) + (1 - \lambda) * l_v^g(i, j; \Omega_s, \Gamma_s)]$$

$$L_t^{full} = \frac{1}{B}\sum_{i=1}^{B}\max_j [l_t^h(i, j; m) + \lambda * l_t^g(i, j; \Omega_d, \Gamma_d) + (1 - \lambda) * l_t^g(i, j; \Omega_s, \Gamma_s)]$$

wherein B is a number of the anchor sample, i is an index of the anchor sample, and j is an index of the negative sample;

$$l_v^h(i, j; m)$$

is the hard margin loss function, and m is the hard margin;

$$l_v^g(i, j; \Omega_d, \Gamma_d)$$

is the dynamic soft margin loss function, and $(\Omega_d, \Gamma_d)$ is a dynamic soft margin;

$$l_v^g(i, j; \Omega_s, \Gamma_s)$$

is the static soft margin loss function, and $(\Omega_s, \Gamma_s)$ is a static soft margin; $\lambda$ is a weighting coefficient, weighting coefficients corresponding to different contrastive sample sets may be the same or different, and all the weighting coefficients are represented as $\lambda$ in the above formulas as an example.

The hard margin loss function may be a triplet contrastive loss function, and the calculation formula is:

$$l_v^h(i, j; m) = \left[s(r_t^i, r_v^j) - s(r_t^i, r_v^i) + m\right]_+$$

$$l_t^h(i, j; m) = \left[s(r_t^j, r_v^i) - s(r_t^i, r_v^i) + m\right]_+$$

wherein $$s(r_t^i, r_v^i)$$

is positive sample pair similarity, $$s(r_t^j, r_v^i), s(r_t^i, r_v^j)$$

are negative sample pair similarity, $[+]_+$ represents a positive taking operation, i.e., $$\left[s(r_t^j, r_v^i) - s(r_t^i, r_v^i) + \alpha\right]_+ = \max\{s(r_t^j, r_v^i) - s(r_t^i, r_v^i) + \alpha, 0\}, r_v^j$$

is a semantic representation of a sample with modal v and index i, other semantic representations $$r_v^j, r_t^i, r_t^j$$

are similar, if the modal is text t, the corresponding semantic representation is a text representation, and if the modal is video v, the corresponding semantic representation is a video representation. The text representation $$r_t^i, r_t^j$$

may be obtained by the text encoder model, and the video representation $$r_v^i, r_v^j$$

may be obtained by the video encoder model.

The above describes the calculation of the loss function of the contrastive sample set based on the soft margin loss function and the hard margin loss function, and the calculation process of the soft margin loss function is described below.

Referring to FIG. 7, the soft margin loss function may include the dynamic soft margin loss function and the static soft margin loss function which have similar calculation processes. Taking the dynamic soft margin loss function $$l_v^s(i, j; \Omega_d, \Gamma_d)$$

as an example, $(\Omega_d, \Gamma_d)$ corresponds to a video and a text, and the present embodiment has a main idea of converting a cross-modal loss function into a summation operation of two loss functions in a single modal.

As shown in FIG. 8, a method for calculating the soft margin loss function may include:

802: acquiring the cross-modal sample pair, the corresponding sample pair in the first modal and the corresponding sample pair in the second modal.

The acquisition may be performed based on sample pairs corresponding to a contrastive sample set, the sample pairs corresponding to the contrastive sample set include a sample pair corresponding to a positive sample and a sample pair corresponding to a negative sample, the sample pair corresponding to the positive sample includes the positive sample and a sample in a different modal from the positive sample, and the sample pair corresponding to the negative sample includes the negative sample and a sample in a different modal from the negative sample. For example, if the positive and negative samples are videos, and the other modal is a text, the positive and negative samples may be referred to as a positive video and a negative video respectively, the sample in a different modal from the positive sample may be referred to as a positive text, and the sample in a different modal from the negative sample may be referred to as a negative text, such that the sample pair corresponding to the positive sample includes the positive video and the positive text, and the sample pair corresponding to the negative sample includes the negative video and the negative text. As shown in FIG. 7, the sample pair corresponding to the positive sample includes positive video P and positive text "a car is shown", and the sample pair corresponding to the negative sample includes negative video N and negative text "a car is being displayed".

Figure 9:
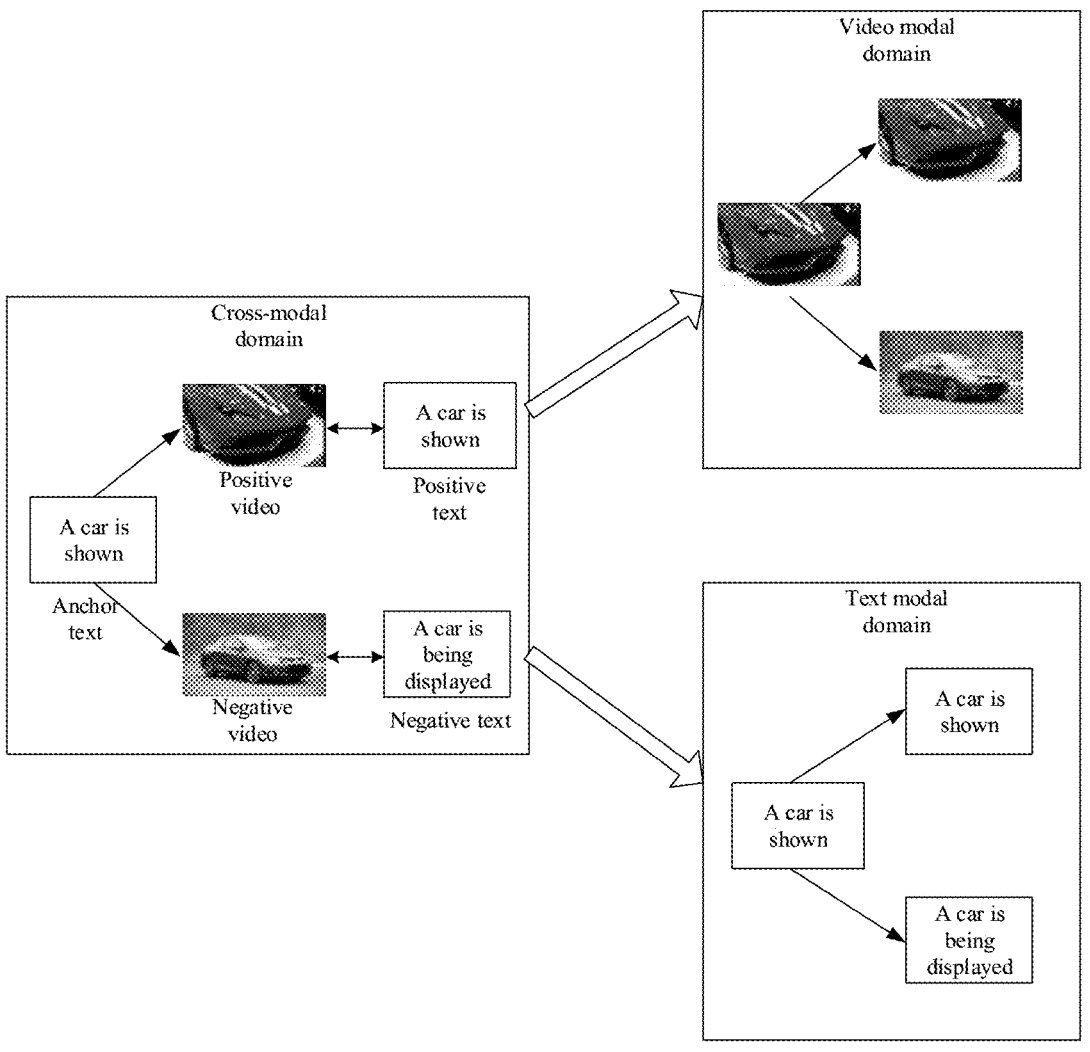
FIG. 9 is a schematic diagram according to a ninth embodiment of the present disclosure.

As shown in FIG. 9, the contrastive sample set across modal domains includes an anchor text, a positive video and a negative video, the positive video corresponds to a positive text, the negative video corresponds to a negative text, corresponding content of the anchor text in the video modal domain is referred to as an anchor video, and the anchor video is the same as the positive video.

The sample pairs in the first modal include <anchor text, positive text> and <anchor text, negative text>; the sample pairs in the second modal include <anchor video, positive video> and <anchor video, negative video>.

802: processing the sample pair in the first modal using a semantic representation model in the first modal to obtain a similarity distance of the sample pair in the first modal, and processing the sample pair in the second modal using a semantic representation model in the second modal to obtain a similarity distance of the sample pair in the second modal.

Referring to FIG. 7, for different states (dynamic and static) and different modals (text and video), the semantic representation model may also be referred to as a supervision expert for the corresponding state and the corresponding modal, such as a dynamic text supervision expert, or the like.

Taking a static supervision expert group as an example, the sample pairs in the first modal, i.e., <anchor text, positive text> and <anchor text, negative text>, are processed using a static text supervision expert; the sample pairs in the second modal, i.e., <anchor video, positive video> and <anchor video, negative video> are processed using a static video supervision expert.

The static text supervision expert may obtain the similarity distance of the two sample pairs (<anchor text, positive text> and <anchor text, negative text>) in the first modal. Similarly, the static video supervision expert may obtain the similarity distance of the two sample pairs (anchor video, positive video> and <anchor video, negative video) in the second modal.

Taking the first modal as an example, the static text supervision expert may obtain a text representation of the anchor text and a text representation of the negative text, and then calculate the similarity distance of the sample pairs in the first modal based on the two text representations. This process is formulated as:

$$\Gamma_s(t_i, t_i) - \Gamma_s(t_i, t_j) = 1 - \frac{<bert(t_i), bert(t_j)>}{\|bert(t_i)\|\|bert(t_j)\|}$$

wherein $\Gamma_s(t_i,t_i)-\Gamma_s(t_i,t_j)$ is the similarity distance of the sample pairs in the first modal, $bert(t_i)$ is the text representation of anchor text $t_i$, $bert(t_j)$ is the text representation of negative text $t_j$, and here, the static text supervision expert is configured as a bert-sentence model as an example. $<*>$ is an inner product operation, and $\|*\|$ is a norm operation.

Similarly, the similarity distance of the sample pairs in the second modal may be obtained based on the static video supervision expert. This process is formulated as:

$$\Omega_s(v_i, v_i) - \Omega_s(v_i, v_j) = 1 - \frac{<pooling(\psi(v_i)), pooling(\psi(v_j))>}{\|pooling(\psi(v_i))\|\|pooling(\psi(v_j))\|}$$

wherein $\Omega_s(v_i,v_i)-\Omega_s(v_i,v_j)$ is the similarity distance of the sample pairs in the second modal, $\psi(v_i)$ is a video representation of anchor video $v_i$, $\psi(v_j)$ is a video representation of negative video $v_j$, and the static video supervision expert is configured as, for example, a CNN, specifically, resnet-152. Different from the text, processing of the video is performed on video frames, and therefore, a pooling operation may be performed on features extracted by the CNN to convert the video representation from a matrix form to a vector form.

The above shows a processing flow of the static supervision expert group, and a dynamic supervision expert group has a similar processing flow, except that the static supervision expert group adopts an existing pre-training model, such as the above-mentioned BERT model or the resnet-152 model, while the dynamic supervision expert group adopts the cross-modal retrieval model; that is, parameters of the cross-modal retrieval model are continuously adjusted, and for a current time, the sample pair in each modal may be processed using the current parameters existing at the current time. For example, the sample pair in the first modal is processed using the parameters of the existing text encoder model, and the sample pair in the second modal is processed using the parameters of the existing video encoder model.

Through the above-mentioned processing operation, four similarity distances may be obtained, and referred to as static text similarity distance $\Gamma_s$ (i,j), static video similarity distance $\Omega_s$ (i,j), dynamic text similarity distance $\Gamma_d$(i,j) and dynamic video similarity distance $\Omega_d$ (i,j) respectively. The static text similarity distance and the static video similarity distance may be collectively referred to as a static similarity distance, and the dynamic text similarity distance and the dynamic video similarity distance may be collectively referred to as a dynamic similarity distance.

In the present embodiment, the similarity distance in a single modal may be calculated using the semantic representation model in the corresponding single modal.

803: processing the similarity distance of the sample pair in the first modal to obtain a soft margin in the first modal, and processing the similarity distance of the sample pair in the second modal to obtain a soft margin in the second modal.

As shown in FIG. 7, the similarity distance may be normalized to obtain the corresponding soft margin. This process is formulated as:

$$F(\Gamma(i, j); \alpha, \beta) = \frac{\Gamma(i, j) - E[\Gamma(i, j)]}{\sqrt{\text{var}[\Gamma(i, j)]/\sigma(\beta)}} + \alpha$$

wherein $\Gamma$(i,j) is the similarity distance in the first modal; for example, for the static state, $\Gamma$(i,j) is specifically $\Gamma_s$(i,j), and $\Gamma_s$(i,j)=$\Gamma_s$ $(t_i,t_i)-\Gamma_s(t_i,t_j)$; F($\Gamma$(i,j); $\alpha,\beta$) is the normalized similarity distance, i.e., the corresponding soft margin; for example, F($\Gamma_s$(i,j);$\alpha,\beta$) is a static text soft margin. $\alpha,\beta$ are hyper-parameters, $\sigma(\beta)$ is a variance corresponding to $\beta$, var[*] is a variance operation, and E[*] is an expected operation.

Calculation modes of other soft margins are similar and are not detailed, and a static text soft margin, a static video soft margin, a dynamic text soft margin and a dynamic video soft margin may be obtained through normalization.

By normalizing the similarity distance, the similarity distances under different modals may be balanced, thus having comparability.

804: calculating a contrastive loss function in the first modal based on the soft margin in the first modal and the predicted similarity distance, and calculating a contrastive loss function in the second modal based on the soft margin in the second modal and the predicted similarity distance.

805: calculating the soft margin loss function according to the contrastive loss function in the first modal and the contrastive loss function in the second modal.

The contrastive loss function in the first modal and the contrastive loss function in the second modal may be added, and the added function may be used as the soft margin loss function. This process is formulated as:

$$l_v^s(i, j; \Omega, \Gamma) = l_v^h(i, j; F(\Omega(i, j); \alpha, \beta)) + l_v^h(i, j; F(\Gamma(i, j); \alpha, \beta))$$

$$l_t^s(i, j; \Omega, \Gamma) = l_t^h(i, j; F(\Omega(i, j); \alpha, \beta)) + l_t^h(i, j; F(\Gamma(i, j); \alpha, \beta))$$

wherein $$l_v^s(i, j; \Omega, \Gamma), l_t^s(i, j; \Omega, \Gamma)$$

are the soft margin loss functions corresponding to two contrastive sample sets respectively, $$l_v^h(i, j; F(\Gamma(i, j); \alpha, \beta))$$

is the contrastive loss function in the first modal, and $$l_v^h(i, j; F(\Omega(i, j); \alpha, \beta))$$

is the contrastive loss function in the second modal. Specifically, during the calculation of the static soft margin loss function, the above $\Gamma$(i,j), $\Omega$(i,j) are $\Gamma_s$(i, j),$\Omega_s$ (i,j) respectively; during the calculation of the dynamic soft margin loss function, the above $\Gamma$(i,j),$\Omega$(i,j) are $\Gamma_d$(i,j), $\Omega_d$(i,j) and respectively. Both the contrastive loss function in the first modal and the contrastive loss function in the second modal may be calculated using the above-mentioned calculation principle for the hard margin loss function, with a difference lying in that the margin of the hard margin loss function is a fixed value m, and the margins of the contrastive loss functions in the two modals are a corresponding soft margin $\Gamma(\Omega(i,j)$; $\alpha,\beta)$.

In the present embodiment, the calculation process of the soft margin loss function is converted into the sum of the contrastive loss function in the first modal and the contrastive loss function in the second modal, such that the calculation of the cross-modal loss function may be converted into the calculation of the loss function in the single modal, thus improving a calculation efficiency of the soft margin loss function. The soft margin loss function includes the dynamic soft margin loss function and the static soft margin loss function, such that the soft margin loss function may include knowledge of other models and knowledge of own models, thus improving the effect of the cross-modal retrieval model. The static similarity distance is acquired using the pre-training model, such that the knowledge of the existing model may be introduced using the existing model, and the knowledge of the own models may be introduced using the current parameters of the cross-modal retrieval model.

Figure 10:
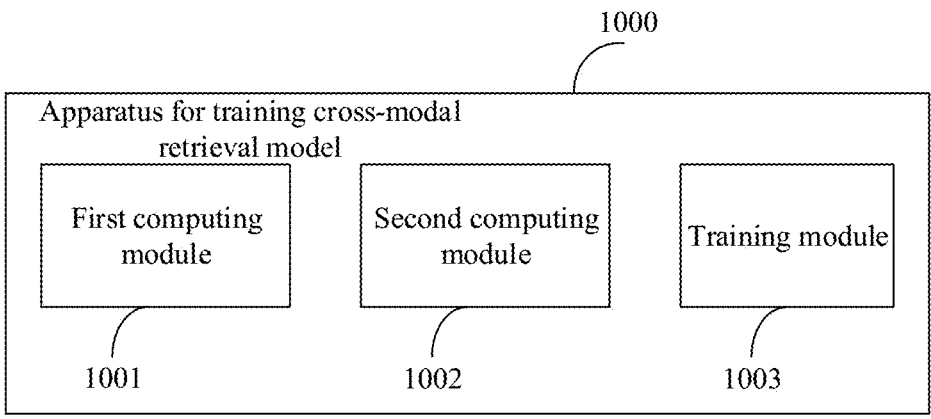
FIG. 10 is a schematic diagram according to a tenth embodiment of the present disclosure.

FIG. 10 is a schematic diagram according to a tenth embodiment of the present disclosure, the present embodiment provides an apparatus for training a cross-modal retrieval model, and the apparatus 1000 includes:

a first computing module 1001 configured to determine similarity of a cross-modal sample pair according to the cross-modal sample pair, the cross-modal sample pair including a sample of a first modal and a sample of a second modal, and the first modal being different from the second modal; a second computing module 1002 configured to determine a soft margin based on the similarity, and determine a soft margin loss function based on the soft margin; and a training module 1003 configured to determine a total loss function based on the soft margin loss function, and train a cross-modal retrieval model according to the total loss function.

In some embodiments, at least one cross-modal sample pair is provided, and includes a positive sample pair and a negative sample pair, the positive sample pair includes an anchor sample and a positive sample, the negative sample pair includes the anchor sample and a negative sample, the anchor sample has the first modal, and the positive sample and the negative sample have the second modal; the second computing module 1002 is specifically configured to: calculate a distance between similarity of the positive sample pair and similarity of the negative sample pair to obtain a similarity distance; and determine the soft margin based on the similarity distance.

In some embodiments, the second computing module 1002 is further specifically configured to: normalize the similarity distance to obtain a normalized similarity distance, and determine the normalized similarity distance as the soft margin.

In some embodiments, the similarity distance includes a similarity distance in the first modal and a similarity distance in the second modal; the second computing module 1002 is further specifically configured to: determine a soft margin in the first modal based on the similarity distance in the first modal, and calculate a contrastive loss function in the first modal based on the soft margin in the first modal; determine a soft margin in the second modal based on the similarity distance in the second modal, and calculate a contrastive loss function in the second modal based on the soft margin in the second modal; and calculate the soft margin loss function according to the contrastive loss function in the first modal and the contrastive loss function in the second modal.

In some embodiments, the first computing module 1001 is specifically configured to: acquire the cross-modal sample pair, the corresponding sample pair in the first modal and the corresponding sample pair in the second modal; process the sample pair in the first modal using a semantic representation model in the first modal to obtain the similarity distance in the first modal, and process the sample pair in the second modal using a semantic representation model in the second modal to obtain the similarity distance in the second modal.

In some embodiments, the cross-modal sample pair corresponds to at least one contrastive sample set, and the training module 1003 is specifically configured to: calculate a loss function of the corresponding contrastive sample set based on the soft margin loss function; and calculate the total loss function based on the loss function of each corresponding sample set of the at least one contrastive sample set.

In some embodiments, the soft margin loss function includes a soft margin loss function for at least one state, and the training module 1003 is further specifically configured to: perform weighted summation on the soft margin loss function for the at least one state to obtain a weighted summation function; add the weighted summation function and the hard margin loss function, and calculate the loss function of the corresponding contrastive sample set based on the added function.

In some embodiments, the similarity distance includes a static similarity distance and a dynamic similarity distance, the soft margin loss function includes a static soft margin loss function and a dynamic soft margin loss function, the static soft margin loss function is calculated based on the static similarity distance, the dynamic soft margin loss function is calculated based on the dynamic similarity distance, and the second computing module 1002 is specifically configured to: calculate the distance between the similarity of the positive sample pair and the similarity of the negative sample pair using a pre-training model, so as to obtain the static similarity distance; and/or calculate the distance between the similarity of the positive sample pair and the similarity of the negative sample pair using current parameters of the cross-modal retrieval model to obtain the dynamic similarity distance.

It may be understood that in the embodiments of the present disclosure, mutual reference may be made to the same or similar contents in different embodiments.

It may be understood that "first", "second", or the like, in the embodiments of the present disclosure are only for distinguishing and do not represent an importance degree, a sequential order, or the like.

In the embodiment of the present disclosure, the soft margin is determined based on the similarity of the cross-modal sample pair, the soft margin loss function is calculated based on the soft margin, and the total loss function is calculated based on the soft margin loss function, such that different margins may be selected according to different cross-modal sample pairs, thus avoiding a problem caused by the fixed margin, and improving a retrieval effect of the cross-modal retrieval model. The soft margin may be determined based on the similarity distance between the similarity of the positive sample pair and the similarity of the negative sample pair, which may be applicable to a scenario of the triplet contrastive loss function. The total loss function is calculated based on the loss function of each corresponding sample set, such that composition conditions of different negative sample pairs may be considered, thus improving accuracy of the total loss function and then the effect of the cross-modal retrieval model. The similarity distance in a single modal may be calculated using the semantic representation model in the corresponding single modal. The total loss function is calculated based on the loss function of each corresponding sample set, such that composition conditions of different negative sample pairs may be considered, thus improving accuracy of the total loss function and then the effect of the cross-modal retrieval model. The calculation process of the soft margin loss function is converted into the sum of the contrastive loss function in the first modal and the contrastive loss function in the second modal, such that the calculation of the cross-modal loss function may be converted into the calculation of the loss function in the single modal, thus improving a calculation efficiency of the soft margin loss function. The soft margin loss function includes the dynamic soft margin loss function and the static soft margin loss function, such that the soft margin loss function may include knowledge of other models and knowledge of own models, thus improving the effect of the cross-modal retrieval model. The static similarity distance is acquired using the pre-training model, such that the knowledge of the existing model may be introduced using the existing model, and the knowledge of the own models may be introduced using the current parameters of the cross-modal retrieval model.

According to the embodiment of the present disclosure, there are also provided an electronic device, a readable storage medium and a computer program product.

Figure 11:
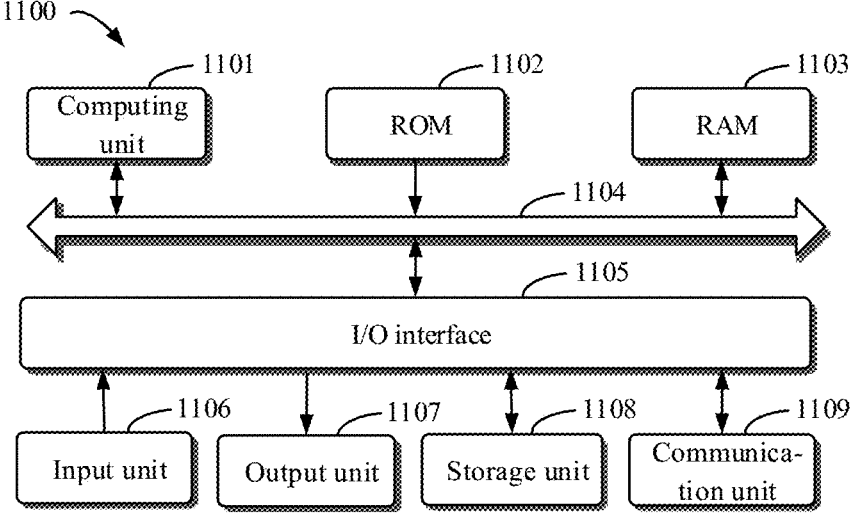
FIG. 11 is a schematic diagram of an electronic device configured to implement any of methods for training a cross-modal retrieval model according to the embodiments of the present disclosure.

FIG. 11 shows a schematic block diagram of an exemplary electronic device 1100 which may be configured to implement the embodiments of the present disclosure. The electronic device is intended to represent various forms of digital computers, such as laptop computers, desktop computers, workstations, servers, blade servers, mainframe computers, and other appropriate computers. The electronic device may also represent various forms of mobile apparatuses, such as personal digital assistants, cellular telephones, smart phones, wearable devices, and other similar computing apparatuses. The components shown herein, their connections and relationships, and their functions, are meant to be exemplary only, and are not meant to limit implementation of the present disclosure described and/or claimed herein.

As shown in FIG. 11, the electronic device 1100 includes a computing unit 1101 which may perform various appropriate actions and processing operations according to a computer program stored in a read only memory (ROM) 1102 or a computer program loaded from a storage unit 508 into a random access memory (RAM) 1103. Various programs and data necessary for the operation of the electronic device 1100 may be also stored in the RAM 1103. The computing unit 1101, the ROM 1102, and the RAM 1103 are connected with one other through a bus 1104. An input/output (I/O) interface 1105 is also connected to the bus 1104.

The plural components in the electronic device 1100 are connected to the I/O interface 1105, and include: an input unit 1106, such as a keyboard, a mouse, or the like; an output unit 1107, such as various types of displays, speakers, or the like; the storage unit 1108, such as a magnetic disk, an optical disk, or the like; and a communication unit 1109, such as a network card, a modem, a wireless communication transceiver, or the like. The communication unit 1109 allows the electronic device 1100 to exchange information/data with other devices through a computer network, such as the Internet, and/or various telecommunication networks.

The computing unit 1101 may be a variety of general and/or special purpose processing components with processing and computing capabilities. Some examples of the computing unit 1101 include, but are not limited to, a central processing unit (CPU), a graphic processing unit (GPU), various dedicated artificial intelligence (AI) computing chips, various computing units running machine learning model algorithms, a digital signal processor (DSP), and any suitable processor, controller, microcontroller, or the like. The computing unit 1101 performs the methods and processing operations described above, such as the method for training a cross-modal retrieval model. For example, in some embodiments, the method for training a cross-modal retrieval model may be implemented as a computer software program tangibly contained in a machine readable medium, such as the storage unit 1108. In some embodiments, part or all of the computer program may be loaded and/or installed into the electronic device 500 via the ROM 1102 and/or the communication unit 1109. When the computer program is loaded into the RAM 1103 and executed by the computing unit 1101, one or more steps for training a cross-modal retrieval model described above may be performed. Alternatively, in other embodiments, the computing unit 1101 may be configured to train the cross-modal retrieval model by any other suitable means (for example, by means of firmware).

Various implementations of the systems and technologies described herein above may be implemented in digital electronic circuitry, integrated circuitry, field programmable gate arrays (FPGA), application specific integrated circuits (ASIC), application specific standard products (ASSP), systems on chips (SOC), complex programmable logic devices (CPLD), computer hardware, firmware, software, and/or combinations thereof. The systems and technologies may be implemented in one or more computer programs which are executable and/or interpretable on a programmable system including at least one programmable processor, and the programmable processor may be special or general, and may receive data and instructions from, and transmit data and instructions to, a storage system, at least one input apparatus, and at least one output apparatus.

Program codes for implementing the method according to the present disclosure may be written in any combination of one or more programming languages. These program codes may be provided to a processor or a controller of a general purpose computer, a special purpose computer, or other programmable data processing apparatuses, such that the program code, when executed by the processor or the controller, causes functions/operations specified in the flowchart and/or the block diagram to be implemented. The program code may be executed entirely on a machine, partly on a machine, partly on a machine as a stand-alone software package and partly on a remote machine, or entirely on a remote machine or a server.

In the context of the present disclosure, the machine readable medium may be a tangible medium which may contain or store a program for use by or in connection with an instruction execution system, apparatus, or device. The machine readable medium may be a machine readable signal medium or a machine readable storage medium. The machine readable medium may include, but is not limited to, an electronic, magnetic, optical, electromagnetic, infrared, or semiconductor system, apparatus, or device, or any suitable combination of the foregoing. More specific examples of the machine readable storage medium may include an electrical connection based on one or more wires, a portable computer disk, a hard disk, a random access memory (RAM), a read only memory (ROM), an erasable programmable read only memory (EPROM or flash memory), an optical fiber, a portable compact disc read only memory (CD-ROM), an optical storage device, a magnetic storage device, or any suitable combination of the foregoing.

To provide interaction with a user, the systems and technologies described here may be implemented on a computer having: a display apparatus (for example, a cathode ray tube (CRT) or liquid crystal display (LCD) monitor) for displaying information to a user; and a keyboard and a pointing apparatus (for example, a mouse or a trackball) by which a user may provide input for the computer. Other kinds of apparatuses may also be used to provide interaction with a user; for example, feedback provided for a user may be any form of sensory feedback (for example, visual feedback, auditory feedback, or tactile feedback); and input from a user may be received in any form (including acoustic, speech or tactile input).

The systems and technologies described here may be implemented in a computing system (for example, as a data server) which includes a back-end component, or a computing system (for example, an application server) which includes a middleware component, or a computing system (for example, a user computer having a graphical user interface or a web browser through which a user may interact with an implementation of the systems and technologies described here) which includes a front-end component, or a computing system which includes any combination of such back-end, middleware, or front-end components. The components of the system may be interconnected through any form or medium of digital data communication (for example, a communication network). Examples of the communication network include: a local area network (LAN), a wide area network (WAN) and the Internet.

A computer system may include a client and a server. Generally, the client and the server are remote from each other and interact through the communication network. The relationship between the client and the server is generated by virtue of computer programs which run on respective computers and have a client-server relationship to each other. The server may be a cloud server, also called a cloud computing server or a cloud host, and is a host product in a cloud computing service system, so as to overcome the defects of high management difficulty and weak service expansibility in conventional physical host and virtual private server (VPS) service. The server may also be a server of a distributed system, or a server incorporating a blockchain.

It should be understood that various forms of the flows shown above may be used and reordered, and steps may be added or deleted. For example, the steps described in the present disclosure may be executed in parallel, sequentially, or in different orders, which is not limited herein as long as the desired results of the technical solution disclosed in the present disclosure may be achieved.

The above-mentioned implementations are not intended to limit the scope of the present disclosure. It should be understood by those skilled in the art that various modifications, combinations, sub-combinations and substitutions may be made, depending on design requirements and other factors. Any modification, equivalent substitution and improvement made within the spirit and principle of the present disclosure all should be included in the extent of protection of the present disclosure.

What is claimed is:

1. A computer-implemented method for training a cross-modal retrieval model which is used by a cross-modal retrieval system, wherein a cross-modal retrieval is used for a retrieval of data of one modal using data of another modal, the method comprising:

determining a similarity of a cross-modal sample pair according to the cross-modal sample pair, the cross-modal sample pair comprising a sample of a first modal and a sample of a second modal, and the first modal being different from the second modal, wherein the first modal is a text, and the second modal is a video, and the cross-modal sample pair comprises a positive sample pair and a negative sample pair, the positive sample pair comprises an anchor sample and a positive sample, the negative sample pair comprises the anchor sample and a negative sample, the anchor sample has the first modal, and the positive sample and the negative sample have the second modal, and wherein the anchor sample is a text in a sample set, the positive sample is a video related to the text in the sample set, and the negative sample is a randomly selected video which is related or not related to the text in the sample set;

determining a soft margin based on the similarity, and determining a soft margin loss function based on the soft margin, wherein the soft margin is a non-fixed value; and determining a total loss function based on the soft margin loss function, and training a cross-modal retrieval model according to the total loss function, using the trained cross-modal retrieval model to receive a text input by a user, determine a video matched with the text using the cross-modal retrieval model, and feed the matched video back to the user, wherein the determining a soft margin based on the similarity comprises:

calculating a distance between similarity of the positive sample pair and similarity of the negative sample pair to obtain a similarity distance; and normalizing the similarity distance to obtain a normalized similarity distance, and determining the normalized similarity distance as the soft margin, and wherein the similarity distance comprises a similarity distance in the first modal and a similarity distance in the second modal, the similarity distance in the first modal being obtained by processing the sample pair in the first modal using a semantic representation model in the first modal and the similarity distance in the second modal being obtained by processing the sample pair in the second modal using a semantic representation model in the second modal;

the determining a soft margin based on the similarity and determining a soft margin loss function based on the soft margin comprises:

determining a soft margin in the first modal based on the similarity distance in the first modal, and calculating a contrastive loss function in the first modal based on the soft margin in the first modal;

determining a soft margin in the second modal based on the similarity distance in the second modal, and calculating a contrastive loss function in the second modal based on the soft margin in the second modal; and calculating the soft margin loss function according to the contrastive loss function in the first modal and the contrastive loss function in the second modal.

2. The method according to claim 1, wherein the cross-modal sample pair corresponds to at least one contrastive sample set, and the determining a total loss function based on the soft margin loss function comprises:

calculating a loss function of the corresponding contrastive sample set based on the soft margin loss function; and calculating the total loss function based on the loss function of each corresponding sample set of the at least one contrastive sample set.

3. The method according to claim 2, wherein the soft margin loss function comprises a soft margin loss function for at least one state, and the calculating a loss function of the corresponding contrastive sample set based on the soft margin loss function comprises:

performing weighted summation on the soft margin loss function for the at least one state to obtain a weighted summation function; and adding the weighted summation function and a hard margin loss function, and calculating the loss function of the corresponding contrastive sample set based on the added function.

4. The method according to claim 1, wherein the similarity distance comprises a static similarity distance and a dynamic similarity distance, the soft margin loss function comprises a static soft margin loss function and a dynamic soft margin loss function, the static soft margin loss function is calculated based on the static similarity distance, the dynamic soft margin loss function is calculated based on the dynamic similarity distance, and the calculating a distance between similarity of the positive sample pair and similarity of the negative sample pair to obtain a similarity distance comprises:

calculating the distance between the similarity of the positive sample pair and the similarity of the negative sample pair using a pre-training model, so as to obtain the static similarity distance; and/or calculating the distance between the similarity of the positive sample pair and the similarity of the negative sample pair using current parameters of the cross-modal retrieval model to obtain the dynamic similarity distance.

5. The method according to claim 1, wherein the cross-modal sample pair corresponds to at least one contrastive sample set, and the determining a total loss function based on the soft margin loss function comprises:

calculating a loss function of the corresponding contrastive sample set based on the soft margin loss function; and calculating the total loss function based on the loss function of each corresponding sample set of the at least one contrastive sample set.

6. An electronic device, comprising:

at least one processor; and a memory communicatively connected with the at least one processor;

wherein the memory stores instructions executable by the at least one processor, and the instructions are executed by the at least one processor to enable the at least one processor to perform a method for training a cross-modal retrieval model which is used by a cross-modal retrieval system, wherein a cross-modal retrieval is used for a retrieval of data of one modal using data of another modal, wherein the method comprises:

determining a similarity of a cross-modal sample pair according to the cross-modal sample pair, the cross-modal sample pair comprising a sample of a first modal and a sample of a second modal, and the first modal being different from the second modal, wherein the first modal is a text, and the second modal is a video, and the cross-modal sample pair comprises a positive sample pair and a negative sample pair, the positive sample pair comprises an anchor sample and a positive sample, the negative sample pair comprises the anchor sample and a negative sample, the anchor sample has the first modal, and the positive sample and the negative sample have the second modal, and wherein the anchor sample is a text in a sample set, the positive sample is a video related to the text in the sample set, and the negative sample is a randomly selected video which is related or not related to the text in the sample set;

determining a soft margin based on the similarity, and determining a soft margin loss function based on the soft margin, wherein the soft margin is a non-fixed value; and determining a total loss function based on the soft margin loss function, and training a cross-modal retrieval model according to the total loss function, using the trained cross-modal retrieval model to receive a text input by a user, determine a video matched with the text using the cross-modal retrieval model, and feed the matched video back to the user, wherein the determining a soft margin based on the similarity comprises:

calculating a distance between similarity of the positive sample pair and similarity of the negative sample pair to obtain a similarity distance; and normalizing the similarity distance to obtain a normalized similarity distance, and determining the normalized similarity distance as the soft margin, and wherein the similarity distance comprises a similarity distance in the first modal and a similarity distance in the second modal, the similarity distance in the first modal being obtained by processing the sample pair in the first modal using a semantic representation model in the first modal and the similarity distance in the second modal being obtained by processing the sample pair in the second modal using a semantic representation model in the second modal;

the determining a soft margin based on the similarity and determining a soft margin loss function based on the soft margin comprises:

determining a soft margin in the first modal based on the similarity distance in the first modal, and calculating a contrastive loss function in the first modal based on the soft margin in the first modal;

determining a soft margin in the second modal based on the similarity distance in the second modal, and calculating a contrastive loss function in the second modal based on the soft margin in the second modal; and calculating the soft margin loss function according to the contrastive loss function in the first modal and the contrastive loss function in the second modal.

7. The electronic device according to claim 6, wherein the cross-modal sample pair corresponds to at least one contrastive sample set, and the determining a total loss function based on the soft margin loss function comprises:

calculating a loss function of the corresponding contrastive sample set based on the soft margin loss function; and calculating the total loss function based on the loss function of each corresponding sample set of the at least one contrastive sample set.

8. The electronic device according to claim 7, wherein the soft margin loss function comprises a soft margin loss function for at least one state, and the calculating a loss function of the corresponding contrastive sample set based on the soft margin loss function comprises:

performing weighted summation on the soft margin loss function for the at least one state to obtain a weighted summation function; and adding the weighted summation function and a hard margin loss function, and calculating the loss function of the corresponding contrastive sample set based on the added function.

9. The electronic device according to claim 6, wherein the similarity distance comprises a static similarity distance and a dynamic similarity distance, the soft margin loss function comprises a static soft margin loss function and a dynamic soft margin loss function, the static soft margin loss function is calculated based on the static similarity distance, the dynamic soft margin loss function is calculated based on the dynamic similarity distance, and the calculating a distance between similarity of the positive sample pair and similarity of the negative sample pair to obtain a similarity distance comprises:

calculating the distance between the similarity of the positive sample pair and the similarity of the negative sample pair using a pre-training model, so as to obtain the static similarity distance; and/or calculating the distance between the similarity of the positive sample pair and the similarity of the negative sample pair using current parameters of the cross-modal retrieval model to obtain the dynamic similarity distance.

10. A non-transitory computer readable storage medium with computer instructions stored thereon, wherein the computer instructions are used for causing a computer to perform a method for training a cross-modal retrieval model which is used by a cross-modal retrieval system, wherein a cross-modal retrieval is used for a retrieval of data of one modal using data of another modal, wherein the method comprises:

determining a similarity of a cross-modal sample pair according to the cross-modal sample pair, the cross-modal sample pair comprising a sample of a first modal and a sample of a second modal, and the first modal being different from the second modal, wherein the first modal is a text, and the second modal is a video, and the cross-modal sample pair comprises a positive sample pair and a negative sample pair, the positive sample pair comprises an anchor sample and a positive sample, the negative sample pair comprises the anchor sample and a negative sample, the anchor sample has the first modal, and the positive sample and the negative sample have the second modal, and wherein the anchor sample is a text in a sample set, the positive sample is a video related to the text in the sample set, and the negative sample is a randomly selected video which is related or not related to the text in the sample set;

determining a soft margin based on the similarity, and determining a soft margin loss function based on the soft margin, wherein the soft margin is a non-fixed value; and determining a total loss function based on the soft margin loss function, and training a cross-modal retrieval model according to the total loss function, using the trained cross-modal retrieval model to receive a text input by a user, determine a video matched with the text using the cross-modal retrieval model, and feed the matched video back to the user, wherein the determining a soft margin based on the similarity comprises:

calculating a distance between similarity of the positive sample pair and similarity of the negative sample pair to obtain a similarity distance; and normalizing the similarity distance to obtain a normalized similarity distance, and determining the normalized similarity distance as the soft margin, and wherein the similarity distance comprises a similarity distance in the first modal and a similarity distance in the second modal, the similarity distance in the first modal being obtained by processing the sample pair in the first modal using a semantic representation model in the first modal and the similarity distance in the second modal being obtained by processing the sample pair in the second modal using a semantic representation model in the second modal;

the determining a soft margin based on the similarity and determining a soft margin loss function based on the soft margin comprises:

determining a soft margin in the first modal based on the similarity distance in the first modal, and calculating a contrastive loss function in the first modal based on the soft margin in the first modal;

determining a soft margin in the second modal based on the similarity distance in the second modal, and calculating a contrastive loss function in the second modal based on the soft margin in the second modal; and calculating the soft margin loss function according to the contrastive loss function in the first modal and the contrastive loss function in the second modal.

* * * * *